United States Patent [19]
Nagai

[11] 3,866,072
[45] Feb. 11, 1975

[54] POWER BOOST AUXILIARY DIODE ASSEMBLY FOR VEHICLE ALTERNATOR

[75] Inventor: Yukio Nagai, Kariya, Japan

[73] Assignee: Nippondenso Co., Ltd., Aichi-ken, Japan

[22] Filed: Sept. 28, 1973

[21] Appl. No.: 401,579

[30] Foreign Application Priority Data
Oct. 2, 1972 Japan.................................. 47-114

[52] U.S. Cl........................ 310/68 D, 321/5, 321/8
[51] Int. Cl. ........................................... H02k 11/00
[58] Field of Search .................... 310/68 D; 321/5, 8

[56] References Cited
UNITED STATES PATENTS
3,160,771  12/1964  Martin et al. ...................... 321/8 R
3,739,210   6/1973  Bahlinger et al.................. 310/68 D FOREIGN PATENTS OR APPLICATIONS
44-4451   2/1969   Japan...................................... 321/5
1,085,094  9/1967  Great Britain.................... 310/68 D Primary Examiner—Donovan F. Duggan
Assistant Examiner—Harry E. Moose, Jr.
Attorney, Agent, or Firm—Flynn & Frishauf

[57] ABSTRACT

The two diodes of a power boost attachment for a three-phase star connected alternator-rectifier unit of a motor vehicle is provided as a flat assembly to be mounted directly across the d.c. terminals on the casing of the alternator-rectifier unit. The third connection is provided by a hollow plug held on an insulating plate in the gap between the metal cleats on which the diodes are mounted, and electrically connected to a metal foil that interconnects the diodes. A lead from the star point of the generator can be brought out for connection to this hollow plug.

5 Claims, 7 Drawing Figures

POWER BOOST AUXILIARY DIODE ASSEMBLY FOR VEHICLE ALTERNATOR

This invention relates to a power boost device for an alternating current generator for a motor vehicle in which advantage is taken of the variations in potential of the center junction of star connected windings of a three-phase generator, which is supplying current to a three-phase bridge rectifier.

Devices of this type are known in which the central junction of star connected windings, which may be referred to as the star point, is connected over one diode to a first terminal mounted on the housing of the generator and over another diode to a second terminal connected to the positive pole of the voltage supply to the motor vehicle, providing in this way a circuit for boosting the power provided by the generator (over a three-phase rectifier bridge) to the d.c. supply of the vehicle.

In some cases the second terminal as well as the first terminal to which diodes were connected were in the neighborhood of the generator, but various problems arose with this arrangement because in each different type of vehicle the favorable connection points would naturally vary a great deal in position. It is particularly difficult to provide a solution for a connecting cable as short as possible from the first terminal to its star point diode and from the other star point diode to the second terminal, because of the problems of vibration stability and possible contact with hot parts of the motor, and so on. The mounting of the diode housings on the vehicle structure, moreover, generally requires supplementary parts, which is also a disadvantage.

It is an object of this invention to provide the auxiliary diodes serving as star point diodes in or on the generator structure without requiring any re-design or any modification of the generator, and to provide them in such a way that they can be readily and directly affixed, without requiring connecting cables and connection terminals.

SUBJECT MATTER OF THE PRESENT INVENTION

Briefly, the diodes are respectively mounted on cleat plates which are in turn held end to end with a gap between them, both on the same side of an insulating plate through which one connection of each diode penetrates. The other connection of the diodes is made directly to the cleat plate on which the diode is mounted, preferably on the floor of a depression in the cleat plate in which the diode is seated. On the other side of the insulating plate there is a conducting foil extending far enough for connection to the connection of the respective diodes that penetrate through the insulating plate. In the gap between the cleat plates a central connection, in the form of a hollow plug, is mounted in the insulating plate and connected to the conducting foil. It projects on the side away from the conducting foil and is designed for contact with a wire or plug connected to the star point of the generator. The cleat plates are designed to connect directly to the d.c. terminals without connecting cables.

An illustrative embodiment of the invention is further described with reference to the annexed drawings, in which:

FIG. 1. is a plan view of a power boost apparatus embodying the invention;

Figure 1:
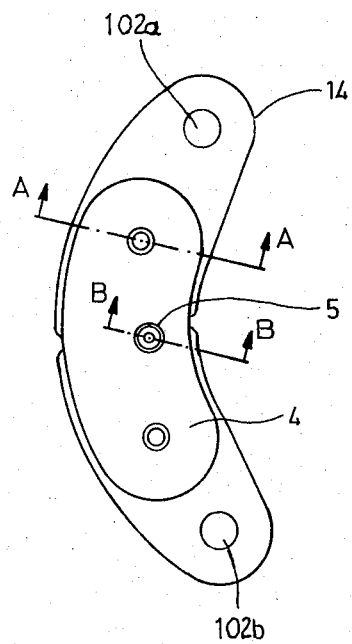
Figure 2:
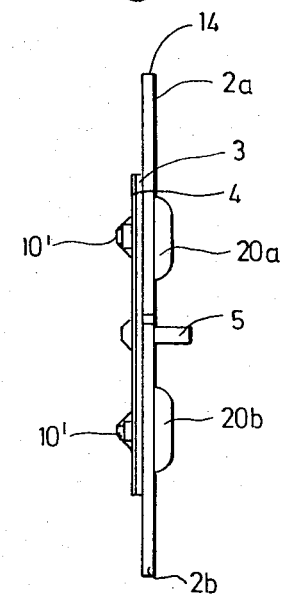
FIG. 2 is a side view of the same.

In FIGS. 1-5 a specific example of a device according to the invention is illustrated. An auxiliary "plus" diode is mounted at 20a on the cleat 2a and an auxiliary "minus" diode is mounted at 20b on the cleat 2b. The cleats 2a and 2b are metal plates arranged end to end with a small gap between them, held in position mechanically by an insulating plate 3, on which they are mounted flush with their outer ends extending beyond the insulating plate. A conducting foil or layer 4 is applied to the side of the insulating plate 3 opposite to that on which the cleats 2 and 2a are held. One lead 10' of each of the diodes 1 (FIG. 4) passes through the insulating plate 3 and is electrically connected to the conducting foil 4. In one case this lead is the anode lead, while in the other case it is the cathode lead, this being the reason why the diodes are referred to as "plus" and "minus" diodes, for although they are similarly constructed, they are oppositely poled electrically.

Figure 5:
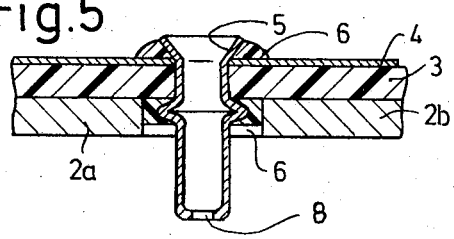
FIG. 5 is a partial cross-section along the line B—B of FIG. 1.

Approximately in the middle between the two auxiliary diodes 1, in the gap between the ends of the cleats 2a and 2b (the gap being broadened at this point), a hollow plug 5 is mounted in the insulating plate 3, as shown in FIG. 5, with one end electrically connected to the foil 4, through which it extends slightly while the other end projects outwards a small distance to give a little length to the hollow contact member. Mounting holes 102a and 102b are provided on the outer end of the cleats 2a and 2b respectively.

Figure 4:
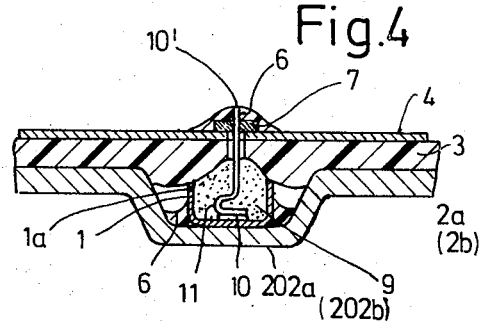
FIG. 4 is a partial cross-section along the line A—A of FIG. 1.

FIG. 4, which is a cross-section along the line A—A of FIG. 1, shows that depressions 202a and 202b are stamped or otherwise made in the cleats 2a and 2b respectively for seating the diodes 1. Each diode has a cup shaped casing 1a seated in the depression 202a,202b, so as to make firm electrical and mechanical contact with the floor of the depression, and hence with the metallic cleat 2a,2b. The diode semiconductor body 10 is held in the diode casing 1a, and an electrode 11 extends from the surface of the semiconductor body 10 farthest from the casing 1a, through the insulating plate 3 and the conducting foil 4, to form the lead 10' that is souldered to the foil 4 as previously mentioned. When the diodes (of similar construction but opposite polarity, as already mentioned) have been seated in their depressions 202a and 202b, the insulating plate 3, already provided with holes for the leads 10', is laid over the diodes and the cleats 2a and 2b with the foil lamination 4 upward. The cleats 2a and 2b, the insulating plate 3 and the conducting sheet 4 are tightly and firmly connected together by any suitable means. The leads 10' of the diodes are soldered to the foil 4, with the help of a lug 7, and a resin 6 seals and holds the joint.

The hollow plug 5, shown in FIG. 5, is designed accept a lead or a mating contact plug connected to the star point of the generator and to make contact therewith. FIG. 5 is a cross-section along the line B—B of FIG. 1 and shows how the hollow plug 5 is mounted on the insulating plate 3 and pressed into contact with the foil 4 by riveting. The riveted fastening supports the further securing of the plug 5 in position by resin seals 6 on both sides of the structure 3,4.

Figure 6:
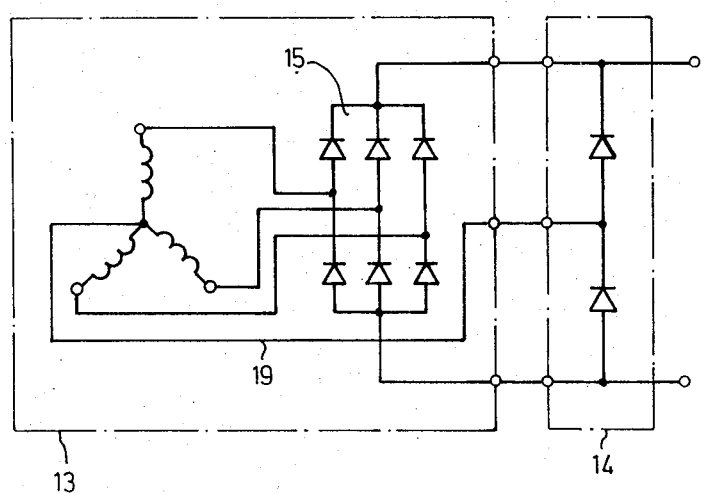
FIG. 6 is a circuit diagram showing the apparatus of the invention connected to the generator and its rectifier.

FIG. 6 is a circuit diagram showing the connection of the power boost attachment 14 after it has been made fast to the generator 13. The three-phase rectifier bridge is shown at 15.

Figure 7:
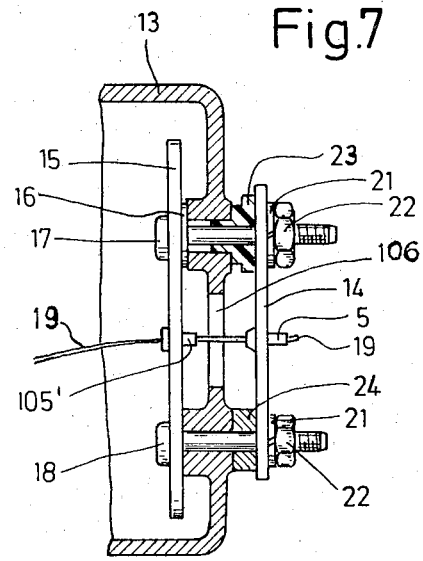
FIG. 7 is a cross-section of the back of a generator housing showing a practical way of affixing the booster to the generator.

FIG. 7 shows the mounting of the power boost attachment 14 according to the invention on the back side of the generator 13. In this view the details of the power boost attachment 14 as described in connection with FIGS. 1–5 are not visible, except for the hollow plug 5, through the small end hole 8 (FIG. 5) of which a wire lead 19 from the star point of the generator has been pulled through and soldered. In other applications the hollow plug 5 could serve as a socket for mating plug to provide a solderless contact.

As shown in FIG. 7 the lead 19 passes through a bushing 105 on the rectifier assembly unit 15 and through a ventilation gap 106 in the casing of the unit 13. The rectifier assembly unit 15 likewise is a flat unit.

Figure 3:
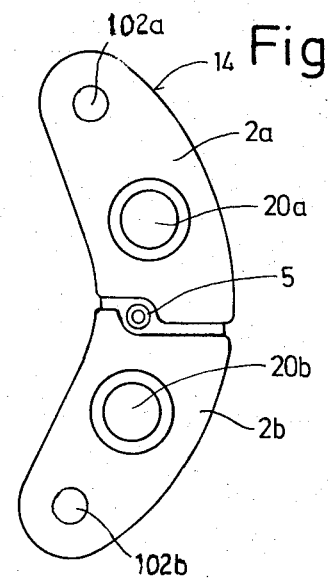
FIG. 3 is a back view of the same.

The power boost unit 14 is mounted on the positive and negative terminals 17 and 18 of the generator, which pass through the mounting holes 101a and 101b shown in FIGS. 1 and 3, being secured by spring lock washers 21 and nuts 22. An insulating bushing 23, of course, insulates one of the terminals (for example the positive terminal) from the housing of the generator 13, while corresponding conducting washer 24 is provided at the terminal grounded to the frame. The rectifier bridge assembly 15 is in this case mounted similarly on the terminals 17 and 18 on the inside of the generator housing.

Although the invention has been described with respect to a particular embodiment it will be understood that variations and modifications are possible within the inventive concept.

I claim:

1. A power boost attachment for a three-phase star connected alternating current generator feeding a three-phase rectifier bridge, comprising a series-connected pair of diodes poled in the same direction with a common connection connectable to the center junction of the star connected winding of said generator and their other terminals connectable to positive and negative terminals of said rectifier bridge, so as to contribute to the output of said bridge when said center junction has an alternating voltage, all so constructed that:

said diodes (20a,20b) are mounted respectively on conducting cleat plates (2a,2b);

said conducting cleat plates are held in juxtaposition, except for a gap between them, by being held on the same side of an insulating plate (3) to which one connection (10') of each diode penetrates, the other connection (1a) of said diodes being made to the respective conducting plates;

a conducting foil or layer (4) is provided on said insulating plate (3) flush with the surface thereof on the side opposite said conducting cleat plates (2a,2b) so as to connect electrically the respective terminals of said diodes passing through said insulating plate (3);

electrically conducting tubular connection means (5) provided with a tubular extension projecting substantially beyond the plane of said insulation plate are provided in said gap, mounted on said insulating plate (3), for making electrical connection between said conducting foil or layer (14) and said center junction of said star connected winding, and means (102a, 102b) are provided on said conducting cleat plates (2a,2b) to facilitate direct connection of each cleat plate to one terminal of the output of said bridge rectifier.

2. A power boost attachment as defined in claim 1 in which depressions (202a,202b) are provided in said respective cleat plates (2a,2b) for respectively seating said diodes (1) individually.

3. A power boost attachment as defined in claim 2 in which said diodes are provided with casings (1a) and each casing (1a) is firmly seated in the said depression (202a,202b) of each cleat plate (2a,2b) and is in mechanical and electrical contact with the floor of said depression.

4. A power boost attachment as defined in claim 3 in which said insulating plate (3) is laid flush on said cleat plates (2a,2b) and extends beyond the position (20a,20b) of said diode casings (1a).

5. A power boost attachment as defined in claim 1 in which said extension of said tubular connection means projects away from said insulating plate on the side thereof farthest from said conducting foil or layer (4) and, furthermore, has a restricted end aperture (8) of a size appropriate for passage of an end of a wire lead and a socket portion of greater diameter of a size appropriate for engaging a gripping plug.

* * * * *

UNITED STATES PATENT OFFICE
CERTIFICATE OF CORRECTION

PATENT NO. : 3866072
DATED : February 11, 1975
INVENTOR(S) : Yukio NAGAI

It is certified that error appears in the above-identified patent and that said Letters Patent are hereby corrected as shown below:

In claim 1 (the last page of the patent), column 4, line 6, before "which" change "to" to -- through --.

Signed and Sealed this twenty-sixth Day of August 1975

[SEAL]

Attest:

RUTH C. MASON
Attesting Officer

C. MARSHALL DANN
Commissioner of Patents and Trademarks